United States Patent [19]

Chemtob et al.

[11] Patent Number: 4,636,372

[45] Date of Patent: * Jan. 13, 1987

[54] ALUMINUM FLUOROPHOSPHATES MADE FROM IMPURE PHOSPHORIC ACIDS AND CONVERSION THEREOF TO ALKALIMETAL PHOSPHATES

[75] Inventors: Elie Chemtob, Claremont; Gary L. Beer, Simi Valley, both of Calif.

[73] Assignee: Occidental Chemical Agricultural Products, Inc., Los Angeles, Calif.

[*] Notice: The portion of the term of this patent subsequent to Mar. 19, 2002 has been disclaimed.

[21] Appl. No.: 709,166

[22] Filed: Mar. 7, 1985

[51] Int. Cl.$^4$ .................. C01B 7/19; C01B 25/16
[52] U.S. Cl. .................. 423/312; 423/305; 423/319; 423/320; 423/321 R; 423/483; 423/484
[58] Field of Search .............. 423/305, 312, 319, 320, 423/321 R, 483, 484

[56] References Cited

U.S. PATENT DOCUMENTS 4,377,560 3/1983 Ore .................. 423/321 R
4,379,776 4/1983 Beer et al. .................. 423/321 R
4,505,884 3/1985 Chemtob et al. .................. 423/484

Primary Examiner—Patrick P. Garvin
Attorney, Agent, or Firm—James F. Tao; William G. Gosz

[57] ABSTRACT

Alkali metal phosphates and HF can be produced from a substantially calcium-free fluoroaluminum phosphate precipitate (which also contains iron) made by the aging of wet process phosphoric acid containing iron, fluorine and aluminum, preferably phosphoric acid analyzing in the range of about 15%–45 weight percent $P_2O_5$, 2–4% $Al_2O_3$ and 1–2% fluorine. One process involves digestion of phosphate ore matrix in recycled phosphoric acid, filtration to remove the insoluble residue, precipitation and filtration to remove gypsum, and aging of the product acid to precipitate the aluminum impurity as a fluoroaluminum phosphate compound. The fluoroaluminum phosphate can be decomposed (as by heating at above 195° C.) to produce HF and aluminum phosphate. The aluminum phosphate can be contacted with alkali metal hydroxide under conditions which produce an alkali metal phosphate.

21 Claims, 1 Drawing Figure

ALUMINUM FLUOROPHOSPHATES MADE FROM IMPURE PHOSPHORIC ACIDS AND CONVERSION THEREOF TO ALKALIMETAL PHOSPHATES

CROSS REFERENCES TO RELATED APPLICATIONS

This application is related to commonly owned pending application Ser. Nos. 282,466 of Ore (now U.S. Pat. No. 4,377,560) and 282,465 of Chemtob and Beer (now U.S. Pat. No. 4,379,776), both filed on July 13, 1981, and Ser. No. 378,456, filed May 17, 1982, of Chemtob and Beer (now U.S. Pat. No. 4,505,884). The entire disclosure of all of these applications is hereby incorporated herein.

BACKGROUND OF THE INVENTION

The invention related to a method for removing aluminum and/or fluorine and/or iron from impure phosphoric acids and involves processes for producing novel, monoclinic, aluminum fluorophosphates (or fluoroaluminum phosphates) of composition $AlFHPO_4.2H_2O$ (or $FAlHPO_4.2H_2O$) which contain iron and are essentially free of calcium, are hygroscopic, are usually layered, and can be readily decomposed (in strong sulfuric acid or by heating) to recover hydrogen fluoride. When decomposed by heating, the aluminum fluorophosphate can produce a solid aluminum phosphate which can be used as a fertilizer, or converted to alkali metal phosphates (e.g. sodium phosphate).

The present invention also involves a means of removing aluminum and fluorine from impure phosphoric acids and means of converting high alumina content phosphate matrix, without the usual beneficiation by flotation, into a relatively low aluminum content phosphoric acid. This process permits the conversion of a much greater proportion of the phosphate values in the matrix to phosphoric acid (and aluminum phosphate) than conventional wet phosphoric acid processes. For example, in the usual beneficiation of phosphate matrix, only about fifty percent of the phosphate values in the matrix are recovered in the beneficiated product. In contrast, about eighty percent of the phosphate values in the matrix can be recovered by the present process.

Phosphate reserves are sedimentary deposits formed by reprecipitation of dissolved phosphate from prehistoric seas. For example, a typical North Florida phosphate ore consists primarily of fluorapatite (a phosphate-containing mineral), quartz sand, and clay minerals. This ore body is called the phosphate matrix.

In current mining practice, the matrix is excavated by draglines, slurried with water at high pressure (e.g. about 200 pounds per square inch) and pumped through miles of pipeline to the beneficiation plants where sand and clays are removed from the fluorapatite by flotation processes, producing the so-called beneficiated phosphate rock.

Current commercial processes call for the usage of either beneficiated or high quality phosphate rock and sulfuric acid as raw materials to produce either hemihydrate or dihydrate phosphoric acid. In most cases where beneficiation operations are required, losses of about 40% $P_2O_5$ values in the matrix occur in the form of slimes and tailings. The slimes are discharged to storage ponds as a dilute slurry containing about 5% of fine particulate minerals, which take years to settle.

In U.S. Pat. No. 3,792,151 to Case, phosphoric acid is produced from low BPL (bone phosphate of lime or tricalcium phosphate) phosphate rock containing about 15% fluorine by reacting the phosphate rock with an equilibrated phosphoric acid.

There is no disclosure in the Case patent of a process for removing aluminum from the product acid by forming an aluminum fluorophosphate. Furthermore, the phosphoric acid produced by the process of the present invention is not an equilibrated phosphoric acid (as defined in the Case Patent) because of the removal of the aluminum and fluorine from the phosphoric acid of the present invention in the precipitation of the fluoroaluminum phosphate.

In one embodiment of U.S. Pat. No. 4,379,776 of Ore, low aluminum and low fluorine content phosphoric acid product is used to dissolve the tricalcium phosphate in the matrix; thereby controlling the fluoride content of the crystallization (of calcium sulfate) step of a phosphoric acid process such that fluoroaluminum phosphate precipitate does not form in the phosphoric acid until after the separation of calcium sulfate from the phosphoric acid. The process of the Ore patent also involves controlling the fluoride content by other means, such as volatilization and addition of sodium or potassium compounds.

In the manufacture of synthetic cryolite, an aluminum fluorophosphate $AlF_2H_2PO_4$ is reported in the U.S. Pat. No. 3,672,189 to Betts. This composition is different from that produced in the present process, in that it is relatively higher in HF than in the $AlFHPO_4$ of the present invention. Also, the production of the Betts compound would not lower the aluminum content of phosphoric acid to as great an extent as does the production of $AlFHPO_4.2H_2O$ as disclosed hereinafter. The process steps involved in the manufacture of synthetic cryolite are quite different from the process for manufacture of the novel fluoroaluminum phosphate of the present invention.

M. S. White, *New Zealand Journal of Science*, Volume 19, pages 421–431 (1976) discloses chemical analyses of chemical compounds in superphosphates made from phosphates of Christmas and Nauru Islands and Queensland. One reported compound was termed "RPF" and assigned the formula: $(Fe,Al)HPO_4F.2H_2O$. X-ray powder diffraction patterns were reported (at page 425) for "RPF" and for "synthesized material, Al analogue only." A chemical analyses of this latter material is given at page 427 of the paper. In the White paper, at Table 13, page 429, thermal degradation data is shown and the compound $(Fe,Al)HPO_4F.2 H_2O$ is reported to have the analysis: 1.82% Fe, 10.4% Al, 0.87% Ca, 14.9% P and 10.5% F.

As used herein, the term "Falphite" (sometimes spelled "Falfite") means a precipitate from impure phosphoric acid (as opposed to pure materials) having the composition $AlFHPO_4.2H_2O$ and also containing iron (due to iron in the phosphate rock or matrix, from which the phosphoric acid was made) and containing less than 0.2 wt.% Ca.

In the present invention, the compound termed "Falphite" typically contains less than about 0.1% Ca, and usually no detectable Ca. Furthermore, the $Fe_2O_3$ analysis of such Falphite is usually less than about 3% (e.g. 2.35%).

Fluoroaluminum phosphate of composition $FAl(HPO_4).2H_2O$ is reported in the July 1980 Russian Journal of Inorganic Chemistry 25(7) 1980; however, this compound is reported as being formed by a process involving adding aluminum sulphate solution to a mixture of phosphoric acid and ammonium fluoride. The reagents used were "pure" or "highly pure" grades. No work is reported in the Russian Journal article of a process whereby $FAlHPO_4.2H_2O$ or $F(Fe,Al)HPO_4.2H_2O$ is prepared from impure phosphoric acid (e.g., green or black acid or from a high alumina content phosphoric acid produced from unbeneficiated matrix).

J. W. Akitt, N. N. Greenwood, and G. D. Lester, "Nuclear Magnetic Resonance and Raman Studies of the Aluminum Complexes formed in Aqueous Solutions of Aluminum Salts Containing Phosphoric Acid and Fluoride Ions," J. Chemical Society (A), 1971, mention the existence in a liquid phase of the complex $AlF_2H_2PO_4$.

Herein percentages are by weight unless otherwise specified.

SUMMARY OF THE INVENTION

The invention relates to producing HF and alkali metal phosphates from a composition containing $FAlHPO_4.2H_2O$, which also contains iron and which contains less than 0.2 wt.% calcium. The compound can be prepared by saturating a fluoride-containing phosphoric acid (which also contains iron) with respect to aluminum, for example, by dissolving $Al_2O_3$ (e.g., as $Al(OH)_3$) in hot, aqueous wet process phosphoric acid of about 15%–45 wt.% $P_2O_5$ analysis, which contains fluoride and iron as impurities. When he aluminum saturated phosphoric acid is cooled or aged, a solid precipitate forms of essentially calcium-free fluoroaluminum phosphate containing iron. The precipitate can be separated by filtration, settling, centrifuging, etc. The resulting phosphoric acid liquid has a low content of aluminum and is low in fluorine.

One process of the invention uses impure aqueous phosphoric acid containing iron and analyzing, in weight percent, no more than about 45% $P_2O_5$, and about 2% to about 4% $Al_2O_3$ and about 1% to about 2% F, and comprises: (a) aging the impure aqueous phosphoric acid at an elevated temperature for sufficient time to permit the formation of solid precipitate containing iron and comprising a fluoroaluminum phosphate; (b) separating the solid precipitate from the aged phosphoric acid thereby removing aluminum and fluorine from the impure, aqueous phosphoric acid; (c) thermally decomposing the solid precipitate to evolve HF and produce a solid comprising an aluminum phosphate which contains iron as an impurity; and (d) reacting the solid with aqueous basic alkali metal solution, such as, aqueous sodium hydroxide, aqueous potassium carbonate, mixtures thereof, and the like to produce a liquid phase comprising an alkali metal phosphate and a solid phase comprising one or more compounds of iron.

The process for manufacture of fluoroaluminum phosphate can be used in connection with any phosphoric acid process which produces a high aluminum content phosphoric acid or a high fluorine content phosphoric acid. The process can also be useful for removing fluorine and aluminum from dihydrate and hemihydrate black acids produced in Florida, or for removing fluorine from phosphoric acid produced by a "kiln" process, such as those of commonly owned, co-pending U.S. application Ser. Nos. 365,305, 365,306, and 365,307 (all filed May 20, 1981) and incorporated herein. Other methods of making such phosphoric acids are in U.S. Pat. Nos. 3,235,330 and 3,241,914.

The term "fluoroaluminum phosphate containing iron," as used herein, indicates a composition of the general formula $FAlHPO_4.2H_2O$ which also contains iron and in which the iron is not necessarily chemically balanced in the manner shown as $(Fe,Al)HPO_4F.2H_2O$.

The solid fluoroaluminum phosphate which contains iron is useful in the production of hydrofluoric acid and aluminum phosphate. The aluminum phosphate can be used as an intermediate in the production of soluble phosphates, fertilizers or animal feed supplements because it is readily defluorinated without forming a glass melt at high temperatures. It can also be converted to valuable sodium or potassium phosphates by reaction with sodium or potassium compounds (e.g. $Na_2CO_3$) as by addition to the calcine feed or by reaction with the aluminum phosphate product of the calcination.

The fluoroaluminum phosphate containing iron can be decomposed (as by heating at about 195° C. or higher) to produce HF and aluminum phosphate. Relatively pure phosphate salts, as of sodium, potassium, etc. can be made by reaction of the appropriate reagent with the aluminum phosphate or with the calcine feed mixture.

The fluoroaluminum phosphate can be produced by the aging of any aqueous phosphoric acid containing sufficient fluorine and aluminum and analyzing no more than about 45% $P_2O_5$, but preferably is produced from an acid analyzing at least 1% F and 2% $Al_2O_3$, typically in the range of about 15%–45 weight percent $P_2O_5$, 2–4% $Al_2O_3$ and 1–2% fluorine.

In one embodiment, the process involves digestion of phosphate ore matrix in recycled phosphoric acid to produce soluble monocalcium phosphate, filtration of the insoluble residue, production of product phosphoric acid and precipitation of gypsum by addition of a sulfate (e.g., sulfuric acid), filtration of the gypsum, and aging of the product acid to precipitate the aluminum impurity as a fluoroaluminum phosphate compound. However, it has been discovered that in continuously producing phosphoric acid from unbeneficiated, high aluminum phosphate ore matrix, by the above process, the steady-state product phosphoric acid produced during the reaction of sulfate with dissolved monocalcium phosphate can have such a high content of fluorine and/or aluminum as to cause premature coprecipitation of Falphite (e.g., an aluminum fluorophosphate containing iron) with the solid calcium sulfate. Such coprecipitation of Falphite and calcium sulphate is undesirable, especially if the Falphite is to be converted into an aluminum phosphate. In the invention of Ore (Ser. No. 282,466) such premature coprecipitation is hindered by the controlled removal of fluorine, preferably effected by adding a sodium and/or potassium compound (e.g., sulfate, carbonate, hydroxide, nitrate, silicate salt, etc.) to the digestion mixture to which sulfuric acid or other sulfate is added. Less preferred is removal of fluorine by volatilization (as, for example, $SiF_4$).

The invention can involve a process for removing aluminum and fluorine (and iron, if present) from impure aqueous phosphoric acid analyzing, in weight percent, no more than about 45% $P_2O_5$, in the range of from about 2 to about 4% $Al_2O_3$ and about from 1 to about 2% F, said process comprising:

(a) aging said impure aqueous phosphoric acid at an elevated temperature for sufficient time to permit the formation of a solid precipitate comprising a fluoroaluminum phosphate which is a hydrate of $AlFHPO_4$, said elevated temperature being between 25° C.

and the boiling temperature of said impure aqueous phosphoric acid; and, (b) separating said solid precipitate from the aged phosphoric acid thereby removing at least a portion of the aluminum and fluorine from the impure, aqueous phosphoric acid.

The impure aqueous phosphoric acid can be obtained by (i) dissolution of a high alumina-content phosphate rock in aqueous phosphoric acid to produce a solution comprising monocalcium phosphate (and dissolved iron, aluminum and fluorine) and (ii) adding sulfate ions in said solution comprising monocalcium phosphate to produce said impure aqueous phosphoric acid and solid calcium sulfate. The alumina content phosphate rock can comprise unbeneficiated phosphate ore matrix, high alumina pebble or any high alumina content phosphate rocks, such as those disclosed in U.S. Pat. No. 4,284,614.

One embodiment of the present invention involves a direct route to phosphoric acid from phosphate matrix, sometimes hereinafter called "the matrix process." This process is the invention of Fernando Ore' and is not per se claimed herein.

The present invention for making HF and alkali metal phosphates can use a Falphite precipitate obtained from a so-called "matrix process" for producing phosphoric acid from unbeneficiated phosphate ore matrix containing clay, fluorides, silica and calcium phosphate, together with additional steps to form and separate Falphite. This process comprises:

(a) digesting said unbeneficiated phosphate ore matrix in aqueous impure phosphoric acid containing as impurities dissolved ions of aluminum and fluorine, to produce undissolved solids and a solution comprising ions of calcium, phosphate, fluorine and aluminum;

(b) separating said undissolved solids from said solution comprising ions of calcium, phosphate, fluorine and aluminum;

(c) adding sufficient sulfuric acid to said solution comprising ions of calcium, phosphate, fluorine and aluminum to cause the precipitation of substantially all of said ions of calcium as solid gypsum and to produce a second impure aqueous phosphoric acid solution containing ions of aluminum and fluorine;

(d) separating said solid gypsum from said second impure aqueous phosphoric acid containing ions of aluminum and fluorine, to produce separated impure aqueous phosphoric acid;

(e) aging said separated impure aqueous phosphoric acid to cause formation of a solid precipitate comprising an aluminum fluorophosphate (which typically will also contain iron) in an aqueous solution comprising phosphoric acid; and (f) separating said solid precipitate from said aqueous solution comprising phosphoric acid to obtain a phosphoric acid product.

Production of good quality gypsum can be achieved at a short residence time (about 15 minutes) from a high alumina phosphoric acid/gypsum mixture having a sulfate concentration of about 3% at about 75° C.

In the matrix process a portion of the separated impure aqueous phosphoric acid can be used in the digestion of step (a).

Falphite can be prepared from almost any aqueous solution containing no more than 45% by weight $P_2O_5$ by adding or adjusting the aluminum content of the solution to between about 2 and about 4% by weight $Al_2O_3$ and by adding or adjusting the fluorine content of the solution to between about 1 and about 2% by weight F. Falphite can be recovered from dilute $P_2O_5$ containing solutions, such as phosphoric acid plant pond waters, or concentrated $P_2O_5$ containing solutions, such as merchant grade phosphoric acid containing about 28 to about 32% $P_2O_5$. After the $P_2O_5$, $Al_2O_3$ and F content of the aqueous solution has been adjusted to the above values, the solution is permitted to age to cause the formation of Falphite which can be recovered by filtration or by decanting the aqueous solution from the solid Falphite.

The aluminum content of an aqueous solution containing more than about 4% $Al_2O_3$ can be adjusted by diluting the solution with water, phosphoric acid or the like. If the aqueous solution contains less than about 2% by weight $Al_2O_3$, the aluminum content is adjusted by adding aluminum values, such as aluminum oxide, aluminum sulfate, cryolite or the like, to the solution. The fluorine content of an aqueous solution containing more than about 2% F can be adjusted by diluting the solution with water, phosphoric acid, or the like or by boiling the solution after the addition of a silica value, such as silicon dioxide. If the aqueous solution contains less than about 1% by weight F, the fluorine content can be adjusted by adding fluorine values, such as sodium fluoride, fluosilicic acid, silicon tetrafluoride, and the like to the solution.

The Falphite, regardless of its origin, can be thermally decomposed at moderately evaluated temperatures to produce gaseous HF and solid aluminum phosphate as described herein.

The solid aluminum phosphate can be reacted with an alkali metal salt in strong aqueous base to produce the corresponding alkali metal phosphate, such as trisodium phosphate, and an alkali metal aluminate, such as sodium aluminate. The reaction can be carried out at a temperature between about 20° C. and the boiling point of the aqueous base and aluminum phosphate mixture. After the reaction is complete, the resulting aqueous mixture is cooled to room temperature to precipitate out the alkali metal phosphates which can be recovered by filtration. Preferably at least 3 molar equivalents of alkali metal per molar equivalent of aluminum phosphate are utilized in the reaction to convert all the aluminum phosphate to the alkali metal phosphate. Preferably the aqueous reaction mixture is heated to near boiling and filtered before the aqueous reaction mixture is cooled to precipitate out the alkali metal phosphate.

DETAILED DESCRIPTION

Figure 1:
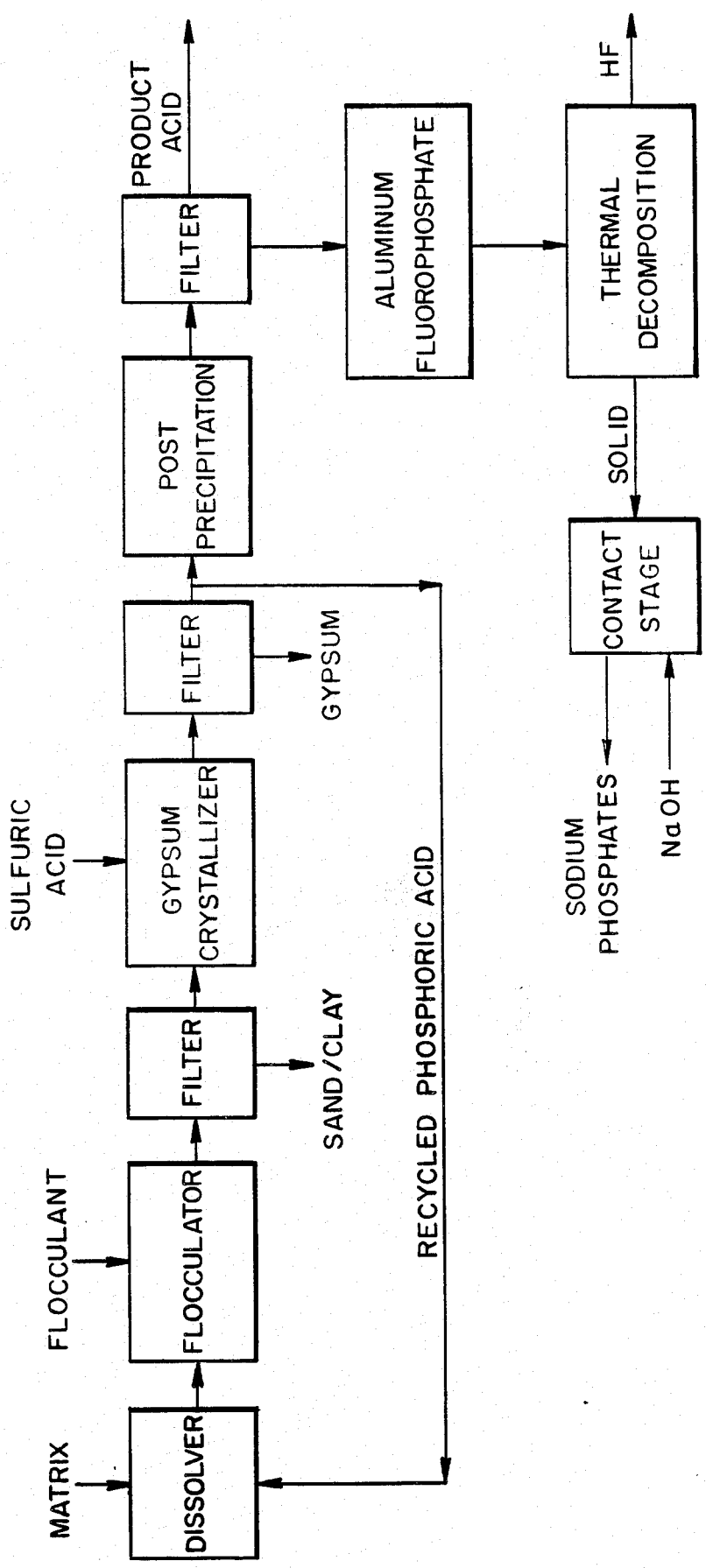
FIG. 1 is a flow diagram of one embodiment of the invention.

Most current commercial processes for the production of wet process phosphoric acid involve reacting beneficiated phosphate rock (essentially the calcium phosphate mineral apatite) with sulfuric acid to produce the crude acid and calcium sulfate (either dihydrate or hemihydrate). However, during the flotation beneficiation of the rock, as much as 30–40% of the phosphate values are discarded, and a fine solids slurry, called slimes, is produced, these slimes require impoundment for several years to allow settling and dewatering of the fine solids, which creates a considerable environmental problem. In addition, there has been a steady decline in the quality of phosphate rock produced, as the producers follow the standard procedure of mining the highest quality rock available.

For these reasons, it is desirable to have a matrix process to utilize raw, unbeneficiated phosphate matrix directly as feed for wet process phosphoric acid production.

Matrix process phosphoric acid can contain undesirably high amounts of aluminum. Fluoroaluminum phosphate (AFP or Falphite) precipitation from hot phosphoric acid (e.g., about 28% $P_2O_5$) can be used for aluminum removal in a matrix process. The precipitation behaves as a classical system with first order kinetics.

Falphite has shown the potential of being an excellent source of high purity HF and sodium phosphates, thus offering the possibility of by-products recovery revenue from a waste material.

Aluminum can be precipitated from hot phosphoric acid solutions (e.g., 28% $P_2O_5$) as a salt identified as a fluoroaluminum phosphate hydrate having the following composition, by weight percent, (which can be expressed as $AlFHPO_4.2H_2O$):

$P_2O_5$ = 40–42%
$Al_2O_3$ = 30–32%
F = 10–11%
$H_2O$ = 18–20%

The product phosphoric acid, after the aluminum precipitation at the right conditions, can be made to contain as low as 1% $Al_2O_3$. The major operation involved is to age the high aluminum acid for around 3 hours at 80°–90° C. Usually essentially no calcium is found in the precipitate. Some iron is also coprecipitated in the aluminum precipitation, but only as a minor constituent (e.g., less than about 3.0% $Fe_2O_3$ by analysis, typically about 1.3% to about 2.4%).

The accompanying FIG. 1 illustrates a preferred embodiment of the invention wherein unbeneficiated phosphate matrix containing iron, aluminum and fluorine is digested with recycled phosphoric acid in the dissolver to form an aqueous slurry of soluble monocalcium phosphate and undissolved solids. A flocculant (e.g., a polyacrylamide) is added to the aqueous slurry in the flocculator to aid the separation of solids. The solids (comprising sand and clay) are separated in the filter to produce a solution comprising monocalcium phosphate and soluble impurities of iron, aluminum and fluorine. Some polyacrylamide flocculants for the separation of solids can be effective in dosage levels of around 100 ppm by weight of reaction mixture. Around 1,000 ppm is usual for other flocculants. The preferred flocculants include slightly ionic polyacrylamides, such as Sanflor AH70-P, produced by Sanyo Industries of Japan.

Sulfuric acid is added to the solution of monocalcium phosphate in the Gypsum Crystallizer to precipitate calcium sulfate (e.g., gypsum) and to produce phosphoric acid containing soluble iron, aluminum and fluorine. Product acid becomes readily available after the gypsum filtration. However, when a high level of aluminum exists in the matrix, the product acid can exceed acceptable commercial specifications content. The solid calcium sulfate is separated from the phosphoric acid in the filter. Part of the filtered phosphoric acid (typically, the strong wash stage of the filtration) is recycled to the dissolver to digest more matrix while the remainder of the phosphoric acid is preferably passed to the Post-Precipitation stage, where the phosphoric acid is aged to form a solid, essentially calcium-free, fluoroaluminum phosphate containing iron. The solid fluoroaluminum phosphate is separated by filtration in the filter. The solid is thermally decomposed in the Thermal Decomposition stage to produce HF and a solid residue comprising aluminum phosphate. The aluminum phosphate may be contacted with sodium hydroxide to produce a sodium phosphate in the contact stage.

Accordingly, the process of FIG. 1 incorporates a postprecipitation stage and a filtration stage for formation and separation of fluoroaluminum phosphate from the product acid. This lowers the aluminum and fluorine contents of the product phosphoric acid.

CHARACTERIZATION OF MATRIX FEED COMPOSITION

Samples of matrix from north Florida were received and analyzed to illustrate the matrix quality and ranges of impurities that would be encountered in a commercial process.

Analyses of numerous matrix samples is reported in Table 1 to illustrate ranges of various compositional variables such as suspended solids, moisture content and the limits of the major impurities aluminum, iron, magnesium and fluoride.

"Suspended solids" are a measurement of fine particles which are easily suspended in aqueous media (e.g., those particles which produce slimes). "Suspended solids" are calculated by dividing the initial dry weight of a sample of matrix by the net loss of weight after five washes with water at ambient temperature. For each wash, the water/initial matrix weight ratio was 3 (typically 30 gms of dry matrix and 90 gms of water). The resulting slurry was then allowed to settle for 60 seconds (after 60 seconds of stirring) and the supernatant liquid, including any suspended solids were decanted.

Weight percent suspended solids is used as an indication of matrix type (clay or sandy). Laboratory work has shown that clay-type matrix requires more flocculant than the sandy type during the clay/sand removal step in the matrix process.

Determination of leachable $Al_2O_3$ and $Fe_2O_3$ contents were made using reagent grade phosphoric-acid containing 28% $P_2O_5$ and 1%F.

In core samples of matrix, leachable $Al_2O_3$ can range from about 23% to about 95% of the total $Al_2O_3$ content, with an average value of about 69%. Leachable $Fe_2O_3$ ranges from about 24% to about 87% of the total, with an average value of about 65%.

As used herein, the term "leachable aluminum" refers to the weight of aluminum (as $Al_2O_3$), in a given phosphate ore, which can be removed therefrom by contact (or digestion), with reagent grade phosphoric acid containing 28 weight % $P_2O_5$ and in which the initial F content is adjusted to 1% by weight.

TABLE 1

| COMPOSITIONS OF VARIOUS MATRIX SAMPLES (WT. %) | | | | | | | | | |
|---|---|---|---|---|---|---|---|---|---|
|  | MATRIX | MATRIX | #146 | #148 | #151 | #147 | #149 | #150 | BENEFICIATED ROCK |
| $P_2O_5$ | 13.8 | 9.9 | 11.9 | 12.1 | 11.6 | 15.6 | 17.8 | 14.6 | 32.7 |
| Suspended Solid | — | — | 22 | 15 | 14 | 80 | 62 | 82 | — |

TABLE 1-continued

COMPOSITIONS OF VARIOUS MATRIX SAMPLES (WT. %)

|  | MATRIX | MATRIX | #146 | #148 | #151 | #147 | #149 | #150 | BENEFICIATED ROCK |
|---|---|---|---|---|---|---|---|---|---|
| Moisture Content Ratios × 100 | (Dry) | (Dry) | 15 | 14 | 16 | 18 | 16 | 19 | (Dry) |
| $Al_2O_3$:$P_2O_5$ | 10.3 | 24.2 | 25.2 | 25.6 | 25.9 | 27.6 | 24.2 | 26.7 | 4.4 |
| MgO:$P_2O_5$ | 4.1 | 0.4 | 2.4 | 2.2 | 2.2 | 4.0 | 3.3 | 4.7 | 1.0 |
| $Fe_2O_3$:$P_2O_5$ | 8.7 | 1.8 | 7.4 | 7.1 | 7.7 | 11.3 | 11.7 | 16.0 | 1.9 |
| CaO:$P_2O_5$* | 1.43 | 1.42 | 1.61 | 1.50 | 1.59 | 1.51 | 1.54 | 1.55 | 1.51 |
| F:$P_2O_5$ | 9.4 | 4.1 | 15.3 | 10.9 | 13.5 | 15.8 | 13.1 | 15.8 | 11.8 |

*(as is)

CONDITIONS OF FORMATION OF $FAlHOP_4.2H_2O$ (Sometimes hereinafter "Falphite")

A. P, Al and F in Phosphoric acid

| Components in solution | Minimum | Maximum |
|---|---|---|
| $P_2O_5$ | 5% | 50% |
| $Al_2O_3$ | 2% | *saturated |
| F | 1% | no maximum |

*The saturation in phosphoric acid solution with respect to $Al_2O_3$ varies with the concentration of $P_2O_5$ and F and also with temperature. The phase diagram of the system $P_2O_5$—$Al_2O_3$—$HFH_2O$ is not yet fully established. The saturation of aqueous $P_2O_5$ with respect to $Al_2O_3$ in the presence of HF at 80° C. is around 4% (with 28% $P_2O_5$).

B. Temperature and Residence Time

With the components conditions cited above, Falphite starts to form after a residence time of 2–3 hours at ambient temperatures or above, preferably above about 60° C., and the precipitation is complete in about 1–2 hours after nucleation. Nucleation can be induced by seeding. The nucleation time decreases with temperature, as well as the total precipitation time: nucleation time increases at temperatures above about 80° C.

If the solution is seeded with Falphite from a previous run, the nucleation time is greatly reduced (e.g. about ½ hour).

The nucleation time is also inversely proportional to the concentration of $P_2O_5$ in the acid and the quality of Falphite formed is also greater at low $P_2O_5$ concentrations, when all other variables are constant (see Table 2).

At low temperatures, Falphite is formed much more slowly, even with seeding. As an example a solution containing 28% $P_2O_5$, 4% $Al_2O_3$ and 2% F behaves as follows:

| Aging Temperature (°C.) | Start of Falphite Formation |
|---|---|
| 25 | 5 days |
| 40 | 30 hours |
| 55 | 6 hours |

The aluminum content can be reduced in a solution of phosphoric acid containing from about 5 to about 45% $P_2O_5$ and about 1 to about 4% $Al_2O_3$ and about 1 to about 2% F (as HF or free fluoride ion) by aging this solution for a period from about 1 hour to about 7 days at temperatures between 25° C. and the boiling temperature of this solution. The precipitate, when dried at 100° C. has the following formula: $AlPO_4.HF.2H_2O$ or $(AlF)^{+2}(HOP_4)^{-2}.2H_2O$. This composition is substantially constant and substantially independent of the temperature, residence time, and the initial concentration of $P_2O_5$, Al and F (See Table 2).

C. Sulfate, Iron, Calcium and Magnesium

When the phosphoric acid solution contains other elements or radicals, such as $SO_4$, $Fe_2O_3$, CaO, MgO, the Falphite precipitate is substantially free from all these impurities except $Fe_2O_3$. Typically, no detectable calcium or sulphate is found and less than about 0.3% MgO. The quantity of $Fe_2O_3$ in the precipitate is almost constant, from about 1.0% to about 3.0% (e.g., 2.35%) by weight, over a wide range of iron concentrations in the original phosphoric acid solution (e.g. about 0.7 to 1.4% $Fe_2O_3$). The formation of this precipitate provides an easy method to deplete the aluminum from a high aluminum content wet process phosphoric acid and also to deplete the fluorine from a high fluorine content wet phosphoric acid solution.

Falphite solubility in phosphoric acid increases as the sulfate content increases. A Falphite precipitation study of phosphoric acid solutions containing 0.5 to 1.5% CaO and no sulfate indicates that solids or gels with unknown composition are formed immediately from a phosphoric acid solution with a F/Al mole ratio near 2 or higher. These gels are very stable at room temperature. However, some of the gels convert to crystalline solids after aging overnight at 80° C. The degree of conversion to crystalline form decreases with increasing F/Al mole ratio. This gel information can occur in excess calcium phosphoric acid solution with very low $Al_2O_3$ content (30% $P_2O_5$, 0.3% $Al_2O_3$, 0.5% CaO, 1% F).

TABLE 2

PHOSPHORIC ACID AT VARIOUS $P_2O_5$ CONCENTRATIONS CONTAINING 3.8% $Al_2O_3$ and 2% F.

| wt % $P_2O_5$ in Starting Acid | Analysis of Filtrate (wt %) | | | Analysis of Precipitate (g/100 g original acid) | | | |
|---|---|---|---|---|---|---|---|
|  | $P_2O_5$ | $Al_2O_3$ | F | Weight | $P_2O_5$ | $Al_2O_3$ | F |
| 55 | Not Done | | | No Precipitate | | | |
| 50 | Not Done | | | Very Faint Precipitate (Negligible) | | | |
| 45 | 42.9 | 2.80 | 1.68 | 3.6 | 41.1 | 30.3 | 9.48 |
| 40 | 39.0 | 1.88 | 1.24 | 7.7 | 40.5 | 29.6 | 9.30 |
| 35 | 31.9 | 1.22 | 1.00 | 10.0 | 38.1 | 27.2 | 9.17 |
| 30* | 26.8 | 1.08 | 1.18 | 9.5 | 38.5 | 27.8 | 9.16 |
| 27** | 23.55 | 0.65 | 0.23 | 11.5 | 39.3 | 28.6 | 9.48 |
| 25 | 20.5 | 0.65 | 1.00 | 10.85 | 38.4 | 27.2 | 9.04 |
| 20 | 16.2 | 0.60 | 0.84 | 11.9 | 36.5 | 27.1 | 8.88 |

In all experiments, 32 g of acid was heated to 80° C. and 0.05 g of Falphite from a previous experiment were added as a seeding as soon as the temperature reached 80° C. and the mixture was stirred at this temp. for 6 hours.
*This experiment's residence time was only 3 hours.
**This experiment was done at an earlier time, first with 30 g of acid, then with the addition of 15 gm of acid containing 3.8% $Al_2O_3$ but no fluorine. Therefore actual total F was 1.33%

REMOVAL OF ALUMINUM FROM WET PROCESS PHOSPHORIC ACID

When unbeneficiated phosphate matrix is used to produce phosphoric acid, the content of aluminum can be so high as to make the product acid unacceptable for most commercial uses. That is, gelatinuous or sludge-like precipitates can form when wet process phosphoric acid of high aluminum content is aged, as during storage or transport. Such precipitates are costly to separate from the phosphoric acid or to remove from the bottom of a storage tank or transport vessel.

The amount of aluminum which can be removed by the present process is usually such as to produce a phosphoric acid analyzing about 1% Al. Such a phosphoric acid can be further treated to produce a lower Al content phosphoric acid, if such is desired. Processes which can be used to further reduce the aluminum content of phosphoric acid include extraction of impurities from the acid (e.g. see U.S. Pat. No. 4,284,614), extractions of substantially purer $P_2O_5$ values from the impure acid (e.g. see U.S. Pat. Nos. 3,397,955; 3,410,656); precipitation of compounds containing aluminum and magnesium from the acid by adding fluorine (e.g. see U.S. Pat. Nos. 3,642,439, 4,136,199 and 4,299,804), and other precipitations (e.g., see U.S. Pat. Nos. 3,442,609, 3,379,501 and British No. 467,843 of June 24, 1937).

Aluminum in wet phosphoric acid can be removed by precipitation of an aluminum-magnesium-fluoride complex called "ralstonite". This compound has been chiefly used for the precipitation of magnesium in a high magnesium content acid (e.g., see U.S. Pat. No. 4,243,643) and this precipitation is currently performed in practice successfully when the ratio of magnesium to aluminum in the acid is sufficiently high to separate magnesium while leaving a substantial amount of aluminum in the liquid phase. When aluminum is the desired element to be removed from a high aluminum acid, the ratio of magnesium to aluminum is usually so small that the precipitated aluminum would be insignificant compared to the bulk of existing aluminum. However, as noted above, such a precipitation can be useful in further treating acid which has been previously treated in the process of the present invention.

The present invention embodies an improved method of removing aluminum from a high aluminum phosphoric acid. For example, the aluminum can be brought down from about 4% to around 1% in the acid after precipitation. The precipitated $P_2O_5$ values in the Falphite need not be lost because they can be later recovered, as can the fluorine and aluminum values.

ILLUSTRATIVE EXAMPLES

EXAMPLE 1

A continuous laboratory matrix dissolution unit, using the process techniques described herein, was operated at about 60° to 70° C. for 63 hours (on an 8-hour per day, 5-day week basis). It was put on standby over night and weekends. While on standby, the acid temperature was held at about 60°–70° C. The dissolution reactor operated satisfactorily at approximately +1.2% free sulfate ion concentration in the solution. At these conditions both matrix dissolution and gypsum crystallization occurred simultaneously. This shows that the process can operate using a single reactor system for dissolution and crystallization.

The average filtration rate of the undigested matrix solids and gypsum during the run was calculated to be 0.24 TPD $P_2O_5$ per square foot of filter area without the use of flocculants. This should improve with flocculants and/or heated wash liquors.

As the run progressed, the aluminum level in the recycled phosphoric acid increased linearly, with respect to time, from 0.6% to 2.3% $Al_2O_3$. At this point, overnight storage of the phosphoric acid at about 80° C. produced a substantial amount of fluoroaluminum phosphate precipitate, lowering the aluminum in the acid to 1.4% (39% reduction).

The iron level of the acid during the run increased from 0.9% to 1.3% $Fe_2O_3/P_2O_5$ ratio. The sandy-type matrix used as feed had a relatively low $Fe_2O_3/P_2O_5$ ratio.

A study was made of the effect of $P_2O_5$ concentration on the aluminum precipitation (fixed aluminum and fluorine levels) in the usual range of $P_2O_5$ concentration expected for phosphoric acid produced by the matrix process as described herein. The experiments were at 80° C. and six hours aging (after seeding with preformed precipitate). The results are summarized as follows:

1. The precipitate has a constant composition independent of $P_2O_5$ concentration corresponding to the stoichiometry $AlFHPO_4 \cdot 2H_2O$;
2. The precipitate forms best at lower $P_2O_5$ concentrations. It does not form at all above about 45% $P_2O_5$;
3. The best conditions appear to be about 25% $P_2O_5$, about 2–4% $Al_2O_3$ and about 1–2% F, which are easily reached in the matrix process by control of the digestion rate and recycle of impure acid from the gypsum filter.

EXAMPLE 2

The compound $FAlHOP_4 \cdot 2H_2O$ was produced from dihydrate process "black" phosphoric acid manufactured by the Occidental Chemical Company in north Florida. $Al_2O_3$ has its maximum solubility at 80° C. The Florida dihydrate acid is similar to the acid produced by the matrix process of Example 1, particularly with regards to the $P_2O_5$ concentration. The analysis of this Florida dihydrate acid in weight % follows:

$P_2O_5 = 26.75$
$F = 2.00$
$SO_4 = 1.47$
$SiO_2 = 0.11$
$Fe_2O_3 = 0.86$
$Al_2O_3 = 3.47$
$CaO = 0.15$
$Mg = 0.25$

The acid was heated at 80° C. (this is a typical temperature of the product matrix acid, as from Example 1). Small quantities of $Al_2O_3$, in the form of pure aluminum hydroxide, $Al(OH)_3$, were added slowly and stirred until completely dissolved. After a while (and many additions of $Al(OH)_3$, the solution did not become completely clear after the last addition, even after 15 minutes. The solution was left for a longer residence time in an attempt to clarify the solution. After 3 hours residence time at 80° C., a massive precipitate appeared suddenly. The precipitate kept increasing in quantity, making the slurry so viscous that the stirrers stopped rotating. The slurry was filtered and the filtered acid analyzed. The residue on the filter was not washed but analyzed "as is."

The analysis of the filtrate was:
$P_2O_5 = 26.1$
$Fe_2O_3 = 0.87$ $Al_2O_3 = 1.65$
$F = 1.35$
$CaO = 0.11$
$Mgo = 0.25$
$SiO_2 = 0.27$ An extrapolated analysis of the solid residue of fluoroaluminum phosphate (by subtracting the amount of each element due to entrainment of filtrate calculated from the relative proportion of calcium in the filtrate) gave the following analysis of the solid.

$P_2O_5 = 41.05$
$Fe_2O_3 = 1.27$
$Al_2O_3 = 24.75$
$F = 9.185$

The filtered acid had 1.6% aluminum oxide, a reduction from the 3.47% in the acid before the aluminum addition and precipitation.

EXAMPLE 3

Production of HF By Heat Decomposition of Falphite

Falphite can be decomposed at temperatures from about 160° C. to about 500° C. to evolve HF and $H_2O$, leaving a residue of solid aluminum phosphate (which usually contains some iron from the wet process phosphoric acid). The phosphate value of the calcined residue is recovered by reacting the solid aluminum phosphate residue with an aqueous sodium salt to produce a liquid phase comprising aqueous sodium phosphates and a solid phase comprising compounds of aluminum and of iron.

When the fluoroaluminum phosphate $FAlHPO_4 \cdot 2H_2O$ (prepared as in Example 2) is heated, the following reactions take place:

1. From room temperature to about 160° C., substantially water only is evolved, to produce the monohydrate.
2. From about 160° C. to about 500° C., HF is evolved. Water and HF evolve very rapidly between about 180° C. to about 270° C. and then evolution is very slow to about 500° C., where substantially all the fluorine has been expelled. The residue at this temperature has still the same bulk physical shape as the original fluoroaluminum phosphate, i.e., no observable melting or clinker formation. The HF-free residue is found upon analyses to be aluminum orthophosphate, $AlPO_4$.

This provides a process for producing HF from impure phosphoric acid. The HF can be swept out with air, or an inert gas, and collected.

The decomposition can also be done under reduced pressure.

The attached Table 3 gives the loss on ignition as well as the quantity of fluorine remaining in a sample of Falphite at each stage of heating.

TABLE 3

HEAT DECOMPOSITION OF FALPHITE

| T °C. | Loss on Heating | F % in heated product (as is) | F % in heated product (reported to 100 g of original) | Ratio of % F in sample to % F in original |
|---|---|---|---|---|
| 70 | original | | | |
| 100 | 10.2 | — | — | — |
| 120 | 15.4 | 10.2 | 8.9 | 100 |
| 140 | 16.8 | — | — | — |
| 160 | 21.2 | 11.3 | 8.9 | 100 |
| 180 | 26.3 | 10.2 | 7.52 | 84 |
| 200 | 35.1 | 2.06 | 1.34 | 15 |

TABLE 3-continued

HEAT DECOMPOSITION OF FALPHITE

| T °C. | Loss on Heating | F % in heated product (as is) | F % in heated product (reported to 100 g of original) | Ratio of % F in sample to % F in original |
|---|---|---|---|---|
| 220 | 36.3 | 1.34 | 0.85 | 9.5 |
| 240 | 36.6 | 0.85 | 0.54 | 6.1 |
| 260 | 36.9 | 0.79 | 0.50 | 5.6 |
| 340 | 37.0 | 0.29 | 0.18 | 2.1 |
| 410 | 37.1 | 0.15 | 0.094 | 1.1 |
| 480 | 37.1 | 0.05 | 0.031 | 0.35 |

EXAMPLE 4

Ten thousand gallons of pond water from the processing streams of a wet process phosphoric acid plant, which contains about 1% by weight $P_2O_5$, about 2% F, less than 0.2% Ca and less than 1% $Al_2O_3$, is treated with cryolite to adjust the aluminum content of the pond water to about 4% by weight. The temperature of the pond waters is raised to about 50° C. and allowed to age for three days to form a fluoroaluminum phosphate hydrate comprising Falphite. The bulk of the aged pond water is decanted off the solid precipitate. The decant is turbid (due to silica); however, with some pond waters no turbidity is observed, the silica being essentially dissolved in the decant. Excess liquid is removed from the solid precipitate by filtration. It is important to remove as much silica as possible from the solid precipitate, because the silica can react with HF to form silica tetrafluoride, and/or water and HF to form fluorosilic acid. Such silicon impurities are difficult to remove from HF.

The filtered solid fluoroaluminum phosphate hydrate is calcined in a kiln by heating the solid aluminum fluorophosphate stepwise to a temperature of about 500° C. to evolve, first (below about 160° F.) substantially water and then HF and water. The HF is recovered. Above about 270° C. the HF approaches anhydrous; however, about 95% of the total fluorine is removed below about 270° C. The resulting aluminum phosphate containing solid is removed from the kiln and added directly to an aqueous solution comprising 20% by weight sodium hydroxide and 10% by weight sodium carbonate. The heat of the hot solid aluminum phosphate and the exothermic heat of reaction raise the temperature of the resulting aqueous solution to over 80° C. The solution is stirred for three hours and then filtered while hot. The filtered solution is cooled to about 25° C. to precipitate out trisodium phosphate. About 80% of the trisodium phosphate can be recovered. Substantially all of the sodium aluminate remains in the solution with the residual trisodium phosphate.

EXAMPLE 5

The aluminum content of merchant grade phosphoric acid (28% $P_2O_5$) is adjusted to about 3% by weight by the addition of aluminum oxide. The fluorine content of the phosphoric acid is adjusted to about 1% by the addition of fluosilicic acid. The resulting mixture of stirred to dissolve the aluminum oxide. The resulting phosphoric acid solution is heated to about 90° C. and allowed to age for one day to form solid fluoroaluminum phosphate comprising Falphite. The aged solution is vigorously stirred and filtered to recover the solid aluminum fluoroaluminum phosphate. The solid aluminum fluoro phosphate is dehydrated by heating to about 160° C. and then heated further to about 500° C. to produce hydrogen fluoride gas and a solid aluminum phosphate product. The HF gas is recovered. The hot aluminum phosphate solid is added to an aqueous 50% by weight sodium hydroxide solution. The resulting solution is stirred for one hour at a temperature of about 80° C. and then filtered hot to remove solids. The filtered solution is cooled to ambient temperature to precipitate out trisodium phosphate. About 80% of the trisodium phosphate is recovered.

What is claimed is:

1. A process for producing HF and alkali metal phosphates and for removing aluminum and fluorine from impure aqueous phosphoric acid analyzing, in weight percent, no more than about 45% $P_2O_5$, in the range of from about 2% to about 4% $Al_2O_3$ and from about 1% to about 2% F, said process comprising:

(a) aging said impure aqueous phosphoric acid at an elevated temperature for sufficient time to permit the formation of solid precipitate comprising a fluoroaluminum phosphate, said elevated temperature being between 25° C. and the boiling temperature of said impure aqueous phosphoric acid;

(b) separating said solid precipitate from the aged phosphoric acid, thereby removing at least a portion of the aluminum and fluorine from the impure, aqueous phosphoric acid;

(c) thermally decomposing said separated solid precipitate without treating with other reactants to evolve HF and produce a second solid;

(d) recovering said evolved HF; and (e) contacting said second solid with an alkali metal hydroxide to produce an alkali metal phosphate.

2. The process according to claim 1 wherein the fluoroaluminum phosphate is a hydrate of $AlFHPO_4$.

3. A process according to claim 2 wherein said impure aqueous phosphoric acid is obtained by (i) dissolution of a high aluminum-content phosphate rock in aqueous phosphoric acid to produce a solution comprising monocalcium phosphate and (ii) adding sulfate ions and hydrogen ions to said solution comprising monocalcium phosphate to precipitate calcium sulfate and produce said impure aqueous phosphoric acid.

4. The process of claim 3 wherein said high aluminum-content phosphate rock comprises unbeneficiated phosphate ore matrix.

5. A process for producing hydrofluoric acid, sodium or potassium phosphates and phosphoric acid from unbeneficiated phosphate ore matrix containing clay, fluorides, silica and calcium phosphate, said process comprising:

(a) digesting said unbeneficiated phosphate ore matrix in aqueous impure phosphoric acid containing as impurities dissolved ions of aluminum and fluorine, to produce undissolved solids and a solution comprising ions of calcium, phosphate, fluorine and aluminum;

(b) separating said undissolved solids from said solution comprising ions of calcium, phosphate, fluorine and aluminum;

(c) adding sufficient sulfuric acid to said solution comprising ions of calcium, phosphate, fluorine and aluminum to cause the precipitation of substantially all of said ions of calcium as solid gypsum and to produce a second impure phosphoric acid solution containing the solid gypsum and ions of aluminum and fluorine;

(d) separating said solid gypsum from said second impure aqueous phosphoric acid containing ions of aluminum and fluorine, to produce a separated impure aqueous phosphoric acid;

(e) aging said separated impure aqueous phosphoric acid at a temperature operable to cause formation of a solid precipitate comprising a fluoroaluminum phosphate in an aqueous solution comprising phosphoric acid;

(f) separating said solid precipitate from said aqueous solution comprising phosphoric acid to obtain a phosphoric acid product;

(g) thermally decomposing said solid precipitate without treating with other reactants to produce a solid comprising aluminum phosphate and to evolve HF;

(h) recovering said evolved HF; and (i) contacting said solid comprising aluminum phosphate with an alkali metal compound under conditions whereby an alkali metal phosphate is produced.

6. The process according to claim 5 wherein the fluoroaluminum phosphate is a hydrate of $AlFHPO_4$.

7. The process of claim 5 wherein a portion of said phosphoric acid product is used in the digestion of unbeneficiated phosphate ore matrix of step (a).

8. A process for producing HF and a sodium phosphate and for removing aluminum and fluorine from impure aqueous phosphoric acid analyzing, in weight percent, in the range of from about 15% to 45% $P_2O_5$, from about 2% to about 4% $Al_2O_3$ and from about 1% to about 2% F, said process comprising:

(a) aging said impure aqueous phosphoric acid at an elevated temperature in the range of about 50° to about 90° C. for sufficient time to permit the formation of solid precipitate comprising fluoroaluminum phosphate;

(b) separating said solid precipitate from the aged phosphoric acid thereby removing aluminum and fluorine from the impure, aqueous phosphoric acid;

(c) thermally decomposing said separated solid precipitate, without treating with other reactants, at a temperature in the range of about 160° C. to about 500° C. to evolve HF and produce a solid comprising an aluminum phosphate;

(d) recovering said evolved HF; and (e) contacting said aluminum phosphate with sodium hydroxide under conditions whereby a sodium phosphate is produced.

9. The process according to claim 8 wherein the fluoroaluminum phosphate is a hydrate of $AlFHPO_4$.

10. A process for producing HF from phosphoric acid, an aluminum value and a fluorine value, comprising:

(a) preparing an aqueous solution comprising less than 45% by weight $P_2O_5$, less than 0.2% by weight Ca, from about 2 to about 4% by weight $Al_2O_3$ and from about 1 to about 2% by weight F;

(b) aging said aqueous solution at an elevated temperature for sufficient time to permit formation of a solid precipitate comprising a fluoroaluminum phosphate, said elevated temperature being between 25° C. and the boiling temperature of said aqueous solution;

(c) separating said solid precipitate from the aged aqueous solution; and (d) thermally decomposing said separated solid precipitate without treating with other reactants to evolve HF and produce a solid aluminum phosphate containing composition.

11. The process according to claim 10 wherein the fluoroaluminum phosphate is a hydrate of $AlFHPO_4$.

12. A process according to claim 11 wherein the solid aluminum phosphate containing composition is reacted with alkali metal ion in an aqueous basic solution to produce an alkali metal phosphate and an alkali metal aluminate, and the alkali metal phosphate is separated from the alkali metal aluminate.

13. The process according to claim 11 wherein the aqueous solution is aged at a temperature of from about 50° to about 90° C.; and the separated solid precipitate is thermally decomposed at a temperature of from about 160° to about 500° C. to evolve HF.

14. The process according to claim 11 wherein the separated solid precipitate comprises, in percent by weight, from about 40 to about 42% $P_2O_5$; from about 30 to about 32% $Al_2O_3$; from about 10 to about 12% F; and from about 18 to 20% $H_2O$.

15. The process according to claim 11 wherein the aqueous solution comprises from about 15% to 45% by weight $P_2O_5$.

16. The process according to claim 12 wherein the aqueous basic solution is aqueous sodium hydroxide and the alkali metal phosphate is trisodium phosphate.

17. A composition of matter comprising, in percent by weight, from about 38% to about 42% $P_2O_5$, from about 28% to about 32% $Al_2O_3$, from about 8% to about 11% F, from about 18% to about 20% $H_2O$, less than about 0.3% MgO, less than about 0.2% CaO and in the range of from about 1 to about 2.5% $Fe_2O_3$.

18. A composition comprising a fluoroaluminum phosphate precipitate which contains iron and is essentially free of calcium, the fluoroaluminum phosphate being approximated by the chemical formula $FAlHPO_4 \cdot 2H_2O$.

19. The composition of claim 18 wherein the contained iron is an impurity.

20. A process for producing HF comprising:
(a) heating the composition of claim 17 to a temperature sufficient to evolve HF; and,
(b) recovering the evolved HF.

21. A composition comprising a fluoroaluminum phosphate precipitate which contains iron and is essentially free of calcium, the fluoroaluminum phosphate being approximated by the chemical formula $FAlHPO_4 \cdot 2H_2O$, and which is produced by a process comprising:
(a) digesting an unbeneficiated phosphate ore matrix containing clay, fluorides, silica and calcium phosphate in aqueous phosphoric acid to produce undissolved solids and a solution comprising ions of calcium, phosphate, fluorine and aluminum;
(b) separating said undissolved solids from said solution comprising ions of calcium, phosphate, fluorine and aluminum;
(c) adding sufficient sulfuric acid to said solution comprising ions of calcium, phosphate, fluorine and aluminum to cause the precipitation of substantially all of said ions of calcium as solid gypsum and producing an impure aqueous phosphoric acid solution containing ions of aluminum and fluorine;
(d) separating said solid gypsum from said impure aqueous phosphoric acid containing ions of aluminum and fluorine, to produce an impure aqueous phosphoric acid;
(e) aging said impure aqueous phosphoric acid to cause formation of a solid precipitate comprising a fluoroaluminum phosphate in an aqueous solution comprising phosphoric acid; and
(f) separating said solid precipitate from said aqueous solution comprising phosphoric acid to obtain a phosphoric acid product and said composition.

* * * * *